United States Patent Office 2,720,548
Patented Oct. 11, 1955

2,720,548

DICHLOROMETHYLBENZHYDROLS AND THEIR ETHERS

W E Craig and Elwood Y. Shropshire, Philadelphia, Pa., and Harold F. Wilson, Moorestown, N. J., assignors to Rohm & Haas Company, Philadelphia, Pa., a corporation of Delaware No Drawing. Application October 5, 1953, Serial No. 384,324

9 Claims. (Cl. 260—618)

This invention concerns a process for preparing various dichloromethylbenzhydrols and their ethers having substituent groups in the phenyl rings thereof. The compounds have the structure

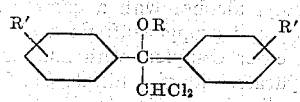

wherein R is hydrogen or a lower non-tertiary alkyl group, particularly one of not over four carbon atoms, and R' represents fluorine, chlorine, bromine, or an alkyl group of not over four carbon atoms. Each phenyl ring may contain more than one of these substituents. This invention also deals with a prrocess of controlling mites on plants by applying thereto the carbinols prepared herein.

Of these various compounds α-dichloromethyl-4,4'-dichlorobenzhydrol is known. It has been examined as a possible synergist for DDT in fly sprays, but found ineffective for this purpose. It was prepared from α,α,-4-trichloroacetophenone and chlorophenyl magnesium bromide, utilizing the Grignard method, one which is less advantageous than the method of this invention.

We have discovered a process which is far simpler, more expeditious, and less expensive than the above method which is scarcely to be recommended as a practical commercial one. Furthermore, our process advantageously permits the preparation of other than the above dichloromethyldichlorobenzhydrol and also leads to the preparation of ethers which have not hitherto been known.

In our process we may conveniently start with a 1,1-bis(phenyl) - 2,2 - dichloroethane, (R'phenyl)₂CHCHCl₂ reacting this with a strong base to dehydrohalogenate this compound whereby a 1,1-bis(R' phenyl)-2-chloroethylene is formed, adding chlorine to this ethylene compound whereby a 1,1-bis(substituted phenyl)-1,2,2-trichloroethane, a new compound, is formed, and reacting this ethane compound with water or an alcohol with the aid of an acidic catalyst soluble in the reaction system, whereby there is formed a compound of the structure (R'phenyl)₂C(OR)CHCl₂

When the alcohol used, ROH, is primary, the alkyl portion thereof appears in the product. Where the alcohol is secondary, an alcohol residue also appears at least in part in the product in the form of an ether, the balance of the product being a carbinol. The mixture of ether and carbinol can be separated, usually by distillation. Where the alcohol is tertiary, the product is almost entirely in the form of the carbinol, R then being hydrogen. The ethers can be hydrolyzed to the corresponding carbinols, thus making it possible to prepare pure carbinols by several routes. It is preferred that when carbinols are desired, the hydrolysis step be performed in the presence of a tertiary alcohol such as tert-butanol.

We prefer to start with the bisphenyldichloroethanes, because they are well known and can readily be prepared from substituted benzenes and dichloroacetaldehyde or derivatives thereof. A particularly convenient method for preparing compounds of the formula (R'phenyl)₂CHCHCl₂ is described in U. S. Patent No. 2,464,600. Useful bisphenyldichloroethanes include the bis(4-chlorophenyl)-, bis(4-bromophenyl)-, bis(4-fluorophenyl)-, bis(dichlorophenyl)-, bis(methylchlorophenyl)-, ditolyl-, bis(ethylphenyl)-, bis(butylphenyl)-, bis(methoxyphenyl)-, bis-(butoxyphenyl)-, etc. derivatives. There may be used a pure isomer or a mixture of isomers. One of the advantages, however, of starting with a bisphenyldichloroethane is that a practically pure isomer, such as the 4-chlorophenyl or the 4-bromophenyl derivative, may be readily obtained and the structure of the final product will thus be fixed and definite.

It is known that compounds of the above structure can be dehydrohalogenated. This is conveniently accomplished by heating a bisphenyldichloroethane with sodium or potassium hydroxide in the presence of an alcohol, such as methyl, ethyl, propyl, or butyl alcohol. Temperatures from about 60° to 125° C. are generally used. With the preferred alcohol, butyl alcohol, reaction temperatures are conveniently 100° to 115° C. The alkali metal chloride formed and any excess caustic are washed away with water and the dehydrohalogenated product is obtained upon stripping. The product has the structure

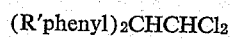

Insofar as such a compound is available, it can also be used as a starting material.

This material is now chlorinated either in bulk or, better, in solution. As solvents, carbon tetrachloride, ethylene dichloride, tert-butyl alcohol, acetic acid, or similar solvent may be used. Chlorine is passed in at 20° to 75° C. until about the theoretical amount has been taken up. The reaction mixture is conveniently washed with water and any solvent remaining is stripped off to yield the desired material,

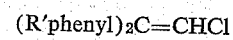

This material is taken up in an organic solvent. If an ether is to be formed, the solvent may be the alcohol with which reaction is to be effected. If a carbinol is to be directly formed, there is used an inert organic solvent and about an equivalent amount of water or there is used a tertiary alcohol. Water by itself is ineffective. In the hydrolysis step there may be used tert-butyl alcohol, tert-amyl alcohol, acetone, methyl ethyl ketone, acetonitrile, nitromethane, or even a hydrocarbon, such as benzene or toluene. The solvent must be neutral or acidic.

To this solution is added an acidic catalyst which is soluble in the reaction system. A great variety of acidic catalysts has been found operative including not only strong acids, such as nitric, hydrochloric, hydrobromic, sulfuric, alkanesulfonic, and arylsulfonic, but also salts of heavy metals which are often used as acidic catalysts, such as zinc chloride, zinc nitrate, zinc formate, zinc acetate, cupric nitrate, cupric chloride, ferric chloride, and other soluble metal salts which are known to be effective as acidic catalysts. So-called "ansolvo acids" or Lewis acids are thus useful. These include the complexes of boron trifluoride and oxygenated compounds which are soluble in the reaction mixture, examples being boron trifluoride etherates, alcoholates, and the like. Mixtures of acids and salts are very effective, such as, for example, nitric acid and copper nitrate. Sufficient water can be added as water of crystallization or as solvent for the acid as in concentrated hydrochloric or nitric acid. As water is added in an amount much above that needed for reaction, yields fall off. Preferably about one mole of acidic catalyst is used per mole of a bisphenyltrichloroethane.

The hydrolysis step is best carried out at 60° to 125° C. The mixture is conveniently heated under reflux. When the reaction has been carried to a practical conversion, catalyst is washed out of the reaction mixture with water or with acid and water. removal of solvent yields the reaction product, which may be purified, if desired, as by crystallization.

If a non-tertiary (i. e., primary or secondary) alcohol was used the product is primarily an ether. The ethers may be used directly for various purposes, particularly as the toxicant in acaricidal compositions. On the other hand the ether may be hydrolyzed to the carbinol. This is conveniently accomplished with acetic acid and hydrochloric acid solution by heating under reflux. The carbinol is collected as a solid, which, if it is desired, can be recrystallized.

Illustrative examples will show typical procedures for preparing defined dichloromethylbenzhydrols and ethers thereof. Parts are by weight.

*Example 1*

(a) A solution was prepared from 230 parts of 1,1-bis (4-chlorophenyl)-2,2-dichloroethane and 134 parts of n-butyl alcohol by stirring and warming a mixture thereof. Thereto was added 80 parts of an aqueous 50% sodium hydroxide solution. The resulting mixture was stirred and heated under reflux for 3.5 hours. Heating was discontinued and 120 parts of water added with good stirring. The mixture was then allowed to stand with formation of layers. The aqueous layer was drawn off and discarded. The organic layer was heated under reduced pressure with distillation of butyl alcohol. The residue was taken up in 190 parts of methanol and 45 parts of acetone and the solution therein was cooled to 5° C. with formation of a solid phase. This was filtered off and dried at 40°–50° C. for 12 hours. The yield was 150 parts of 1,1-bis(chlorophenyl)-2-chloroethylene.

By the same procedure there may be prepared other bis(phenyl)chloroethylenes where the phenyl rings are substituted with fluorine, bromine, or an alkyl group, or with two or more such substituents. These have no observable influence on the procedural steps shown in detail here.

(b) A solution was prepared from 875 parts of 1,1-bis(4-chlorophenyl)-2-chloroethylene and 2400 parts of carbon tetrachloride. Chlorine was passed into this solution at the rate of about one gram mole per hour for an eight hour period. The temperature of the reaction mixture rose to a maximum of 60° C. The reaction mixture was then heated with steam to remove free chlorine and solvent. The residue was separated from water and dried azeotropically with benzene to yield 1036.5 parts of a viscous, light yellow oil, which corresponded in composition to $C_{14}H_9Cl_5$, containing 50.0% of chlorine (theory 50.0%). This was 1,1-bis(4-chlorophenyl)-1,2,2-trichloroethane.

The above procedure was followed, but other solvents, including acetic acid, tert-butyl alcohol, and ethylene dichloride were used in place of carbon tetrachloride. The same product was obtained in each case in similar yields. The same reaction is readily applied to other bis(phenyl)-2-chloroethylenes with formation of the 1,2,2-trichloroethanes therefrom. In particular there may be used as phenyl substituents those referred to in the first part of this example.

(c) There were mixed 58 parts of 1,1-bis(4-chlorophenyl)1,2,2-trichloroethane, 40 parts of cupric nitrate trihydrate, and 150 parts of tert-butyl alcohol. The mixture was stirred and heated under reflux for two hours. The cooled reaction mixture was treated with 90 parts of benzene and 105 parts of 10% hydrochloric acid solution. An aqueous layer formed and was removed. The organic layer was washed twice with 100 parts of water. The benzene was distilled off under reduced pressure, leaving 56 parts of product which crystallized when cool. This was triturated with petroleum ether. The product then melted at 105°–106° C. and corresponded in composition to α-dichloromethyl-4,4'-dichlorobenzhydrol or 1,1-bis(chlorophenyl)-2,2-dichloroethanol.

In the same way other bisphenyldichloroethanols may be formed with such phenyl substituents as fluorine or bromine or the methyl, ethyl, propyl or butyl group or a mixture of these.

The hydrolysis reaction just described was studied with various combinations of solvents and catalysts. The reaction was successfully carried out with p-toluenesulfonic acid monohydrate as catalyst and with tert-butyl alcohol, ethylene dichloride, nitromethane, benzene, and hexane as solvents. In these examples the acid was used in about the preferred molecular proportion. Some preparations were made with a half molar proportion of the acid catalyst with formation of the same product, although in somewhat lower yield. Successful reactions were promoted in tert-butyl alcohol with a commercial mixture of methyl, ethyl, and propyl sulfonic acids, with boron trifluoride-ethyl ether complex, with zinc chloride, with zinc acetate dihydrate, with zinc nitrate hexahydrate, with copper chloride dihydrate, with ferric chloride hexahydrate, with one half mole of copper nitrate plus one mole of nitric acid, with nitric acid, and with dilute sulfuric acid. The reaction was also performed in acetone with such catalysts as copper nitrate trihydrate. As both solvent and catalyst, 90% formic acid was used. A mixture of formic acid and dimethyl formamide was successfully used. The reaction was also run in xylene with zinc formate and formic acid as catalysts. The important consideration is that there be some solubility of acidic catalyst in the reaction system. For formation of carbinols there should be present about sufficient water to supply the OH group. This water may be obtained from decomposition of solvent or catalyst or may be separately added.

*Example 2*

(a) From the 1,1-bis(4-chlorophenyl)-1,2,2-trichloroethane prepared above a portion of 104.5 parts was taken and mixed with 75 parts of cupric nitrate crystals and 800 parts of ethanol. This mixture was stirred and heated under reflux for 16 hours. The reaction mixture was poured into 1500 parts of water. The water layer was separated and the organic layer was taken up in 400 parts of benzene. The benzene solution was washed with water. The benzene solution was then distilled. At 179°–181° C./0.5 mm. a fraction of 54 parts was collected. It corresponded in composition to $C_{16}H_{14}Cl_4O$, ethyl α-dichloromethyl-4,4'-dichlorobenzhydryl ether, an oil.

When the above reaction is carried out with methyl alcohol in place of ethyl alcohol, there is obtained the corresponding methyl α-dichloromethyl-4,4'-dichlorobenzhydrol, melting at 123°–124° C. when recrystallized. Reaction in butyl alcohol yields the corresponding butyl ether. When isopropanol is used as the solvent, the primary product obtained is a mixture of about 50% of the isopropyl ether and 50% of α-dichloromethyl-4,4'-dichlorobenzhydrol. This, if desired, may be hydrolyzed to give the benzhydrol.

(b) There were mixed 70 parts of methyl α-dichloromethyl-4,4'-dichlorobenzhydryl ether, 300 parts of glacial acetic acid, and 240 parts of concentrated hydrochloric acid. The mixture was heated under reflux for 3.5 hours and was then cooled. A solid formed. It was removed by filtering, was washed with water, and was recrystallized from isooctane. It then melted at 105.5°–107° C. A mixed melting point of this material with an authentic sample of α-dichloromethyl-4,4'dichlorobenzhydrol gave no depression, showing that this was the product of the above hydrolysis reaction. Additional product was obtained from the filtrate, bringing the total yield to 95% of theory.

Repetition of the above hydrolysis with the ethyl or butyl ether yields the identical product, α-dichloromethyl-4,4'-dichlorobenzhydrol.

*Example 3*

(a) To a solution of 62 parts of 1,1-bis(4-ethylphenyl)-2-cholorethylene (prepared by dehydrohalogenating 1,1-bis(4-ethylphenyl)-2,2-dichloroethane by the procedure described above), 0.5 part of p-toluenesulfonic acid monohydrate, and 160 parts of methanol there was added tert-butyl hypochlorite in an amount of 24 parts. Reaction occurred with the temperature rising 23° C. (to about 50° C.). The reaction mixture was stirred for five hours, diluted with 150 parts of benzene, and treated with sodium bicarbonate solution. The benzene layer was taken off, washed with water, and distilled. A main fraction was obtained at 148°–157° C./0.1–0.2 mm. which corresponded in composition to methyl α-dichloromethyl-4,4'-diethylbenzhydryl ether.

(b) A portion of this product was heated with acetic acid and concentrated hydrochloric acid under reflux for three hours. The mixture was diluted with excess water. An oil settled out and was taken off. It was dried over magnesium sulfate. This oil corresponded in composition to α-dichloromethyl-4,4'-diethylbenzhydrol.

The above example illustrates how halogenation of the ethylenic starting material may be coupled with hydrolysis without necessity of separating out the reaction product at each stage. The example also demonstrates how an alkyl group may be used as a phenyl substituent. This and other preparations have confirmed that the phenyl group may be substituted with an alkyl group or a halogen to yield the corresponding benzhydrols or their ethers. As has been shown, the ethers are readily hydrolyzed to the benzhydrols.

(c) To a solution of 30 parts of 1,1-bis(4-methylphenyl)-2-chloroethylene in 90 parts of ethylene dichloride chlorine was slowly added until the theoretical amount had been taken up. A maximum temperature of about 56° C. was reached. The reaction mixture was heated to drive off any free chlorine and to take off solvent. There remained a light yellow oil which corresponded in composition to 1,1-bis(methylphenyl)-1,2,2-trichloroethane.

(d) To 20 parts of this product there was added 50 parts of methanol and 15 parts of zinc chloride. The mixture was heated under reflux for 16 hours. This reaction mixture was treated with benzene. The benzene solution was washed well with water, dried over sodium sulfate, and stripped of solvent to yield an oil which corresponds in composition to methyl α-dichloromethyl-4,4'-dimethylbenzhydryl ether.

*Example 4*

A mixture of 56 parts of 1,1-bis(4-chlorophenyl)-1,2,2-trichloroethane and 25.5 parts of anhydrous zinc chloride in 200 parts of n-propanol was heated under reflux for 24 hours. The reaction mixture was diluted with 155 parts of benzene. The benzene solution was washed twice with water. The benzene was distilled off to leave an oil. This was analyzed for its propoxy content and found to be 83% pure propyl α-dichloromethyl-4,4'-dichlorobenzhydryl ether. A portion was distilled at 156°–161° C./0.07 mm., but it was found that some decomposition occurred on distillation.

Hydrolysis of this ether by methods shown above yielded α-dichloromethyl-4,4'-dichlorobenzhydrol, melting at 105°–107° C.

*Example 5*

A mixture of 57 parts of 1,1-bis(4-chlorophenyl)-1,2,2-trichloroethane, 40 parts of boron trifluoride-butyl ether complex, and 200 parts of anhydrous methanol is heated under reflux for 16 hours. The reaction mixture is treated with 150 parts of toluene. The toluene layer is taken off and washed with aqueous sodium bicarbonate solution and with water. The benzene solution is dried over magnesium sulfate and distilled to take off the benzene. The residue is recrystallized from isooctane. It then melts at 123°–124° C. and corresponds in composition to methyl 4,4'-dichlorobenzhydryl ether.

*Example 6*

(a) A solution of 57 parts of 1,1-bis(4-chlorophenyl)-2-chloroethylene in 325 parts of carbon tetrachloride was treated with 34 parts of bromine. Reaction occurred with a temperature rise of 9° C. The reaction mixture stood for 16 hours. It was washed with aqueous sodium bisulfite solution and with water. Solvent was distilled off to leave 77.5 parts of a clear, red oil which solidified on standing. It was recrystallized from isooctane to give a white solid melting at 77°–79° C. It corresponded in composition to 1,1-bis(4-chlorophenyl)-1,2-dibromo-2-chloroethane.

(b) A mixture of 22 parts of this compound, 15 parts of cupric nitrate crystals, and 160 parts of tert-butyl alcohol was heated under reflux for three hours. The reaction mixture was treated with about 160 parts of benzene. The benzene layer was thoroughly washed with water. The solvent was then stripped off to give an oil which solidified. It was recrystallized from octane to give a product melting at 126°–130° C. This was α-bromochloromethyl-4,4'-dichlorobenzhydrol.

(c) A mixture of 25 parts of 1,1-bis(4-chlorophenyl)-1,2-dibromo-2-chloroethane, 12 parts of zinc chloride, and 50 parts of methanol was heated under reflux for 16 hours. The reaction mixture was cooled to about 0° with formation of crystals. These were filtered off, washed with water, and air dried. They melted at 114°–116° C. They corresponded in composition to methyl α-bromochloromethyl-4,4'-dichlorobenzhydryl ether.

(d) A mixture was prepared from 20 parts of methyl α-bromochloromethyl-4,4'-dichlorobenzhydryl ether, 75 parts of glacial acetic acid, and 48 parts of 35% hydrochloric acid. The mixture was heated under reflux for four hours. The mixture was cooled. Crystals formed, were filtered off, and were recrystallized from petroleum ether. The product then melted at 131°–132° C. and corresponded in composition to α-bromochloromethyl-4,4'-dichlorobenzhydrol.

The solution of one or more of the above benzhydrols or their ethers is added with stirring to water and sprayed on plants to be protected from mites or infested with mites. There are provided high initial kills of mites, good residual contact kill, and ovicidal action.

The above compounds may also be formulated in wettable powders or in dusts. A wettable powder can be formulated as follows: 25 parts of one or more of the above benzhydrols or their ethers, 61 parts of clay, 10 parts of magnesium carbonate, 3 parts of sodium naphthalene-formaldehyde sulfonate, and 1 part of an alkylphenoxypolyethoxyethanol. One of the marked advantages of the above benzhydrols and their ethers is their stability in the presence of solid diluents including acidic clays. There are related compounds which, since they lack such stability, are not advisedly used in wettable powders or dusts.

The compounds prepared as has been illustrated are useful as miticidal agents. They may advantageously be dissolved with an inert organic solvent, such as methylated naphthalene or other aromatic hydrocarbons including toluene and xylene. The solution is treated with a small amount of an emulsifying agent. A typical formulation is 25 parts of one of the above carbinols or ethers, 5 parts of an oil-soluble emulsifier, and 70 parts of solvent. As emulsifier there may be used an alkylphenoxypolyethoxyethanol or other solvent-soluble reaction product of an alkylated phenol, a long-chained alcohol, a long-chained mercaptan, a long-chained amine, etc. Also useful alone or in conjunction with another emulsifier are the condensates of polyglycerols and a fatty acid with or without addition of a small amount of phthalic anhydride.

We claim:

1. A process for preparing compounds of the structure

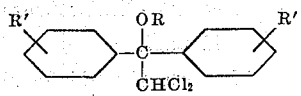

which comprises adding chlorine to a compound of the structure

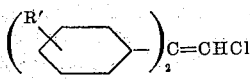

whereby a 1,1-bis(phenyl)-1,2,2-trichloroethane is formed, and heating this compound between 60° and 125° C. in a monohydric aliphatic alcohol of not over five carbon atoms with an acidic catalyst soluble in the reaction medium, R' in the above formulae representing a member of the class consisting of fluorine, chlorine, bromine, and alkyl groups of not over four carbon atoms, and R being a member of the class consisting of hydrogen and alkyl groups of not over five carbon atoms.

2. A process for preparing compounds of the structure

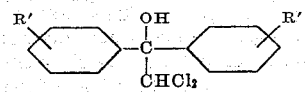

which comprises adding chlorine to a compound of the structure

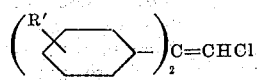

whereby a 1,1-bis(phenyl)-1,2,2-trichloroethane is formed, and heating this compound between 60° and 125° C. in a tertiary alkanol of not over five carbon atoms with an acidic catalyst having solubility in this reaction mixture, R' representing a member of the class consisting of fluorine, chlorine, bromine, and alkyl groups of not over four carbon atoms.

3. A process for preparing compounds of the structure

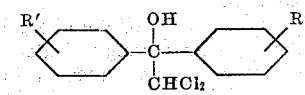

which comprises adding chlorine to a compound of the structure

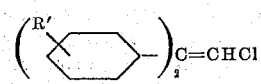

whereby a 1,1-bis(phenyl)-1,2,2-trichloroethane is formed, heating this compound between 60° and 125° C. in a primary alcohol, ROH, with an acidic catalyst soluble in the reaction mixture, whereby a compound of the formula

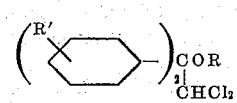

is formed, and hydrolyzing this compound by heating it with acetic acid and hydrochloric acid, R' representing a member of the class consisting of fluorine, chlorine, bromine, and alkyl groups of not over four carbon atoms, and R being an alkyl group of not over four carbon atoms.

4. A process for preparing compounds of the structure

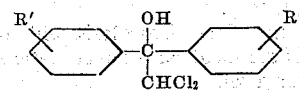

which comprises adding chlorine to a compound of the structure

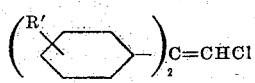

whereby a 1,1-bis(phenyl)-1,2,2-trichloroethane is formed, and heating it between 60° and 125° C. in a polar organic solvent therefor with an acidic catalyst soluble in this reaction mixture, R' being a member of the class consisting of fluorine, chlorine, bromine, and alkyl groups of not over four carbon atoms.

5. A process for preparing α-dichloromethyl-4,4'-dichlorobenzhydrol which comprises adding chlorine to 1,1-bis(4-chlorophenyl)-2-chloroethylene whereby 1,1-bis(4-chlorophenyl)-1,2,2-trichloroethane is formed, and heating this compound between 60° and 125° C. in a polar organic solvent therefor with an acidic catalyst soluble in this reaction mixture.

6. The process of claim 5 wherein the polar organic solvent is tert-butanol.

7. The process of claim 6 wherein the acidic catalyst is cupric nitrate trihydrate.

8. In a process for preparing compounds of the structure

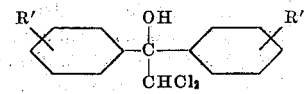

wherein a 1,1-bis(phenyl)-1,2,2-trihaloethane is formed, the improvement which comprises hydrolyzing said trihaloethane between 60° and 125° C. in a polar organic solvent with an acidic catalyst soluble in the reaction mixture, R' being a member of the class consisting of fluorine, chlorine, bromine, and alkyl groups of not over four carbon atoms.

9. In a process for preparing a compound of the structure

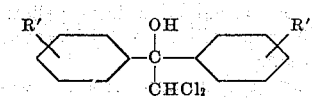

wherein a 1,1-bis(R'-phenyl)-2-chloroethylene is chlorinated to form a 1,1-bis(R'-phenyl)-1,2,2-trichloroethane, the steps which comprise reacting said 1,1-bis(R'-phenyl)-1,2,2-trichloroethane with an alkanol of not over five carbon atoms, whereby an ether group is introduced, and reacting said ether with acetic acid and aqueous hydrochloric acid under reflux whereby said compound is formed, R' being a member of the class consisting of fluorine, chlorine, bromine, and alkyl groups of not over four carbon atoms.

References Cited in the file of this patent

UNITED STATES PATENTS

| | | |
|---|---|---|
| 2,315,557 | Soday | Apr. 6, 1943 |
| 2,430,586 | Ruthruff et al. | Nov. 11, 1947 |

OTHER REFERENCES

Pepper et al.: Jour. Amer. Chem. Soc., vol. 72 (1950), p. 1417.

Gilman et al.: Jour. Amer. Chem. Soc., vol. 73 (1951), p. 4030.